(12) United States Patent
Suzuki

(10) Patent No.: US 6,198,708 B1
(45) Date of Patent: Mar. 6, 2001

(54) DISK DRIVING DEVICE CAPABLE OF FORMATTING A FINALIZED REWRITABLE DISK

(75) Inventor: Kazuaki Suzuki, Osaka (JP)

(73) Assignee: Funai Techno-Systems Co., Ltd., Osaka (JP)

(*) Notice: Subject to any disclaimer, the term of this patent is extended or adjusted under 35 U.S.C. 154(b) by 0 days.

(21) Appl. No.: 09/084,986

(22) Filed: May 28, 1998

(30) Foreign Application Priority Data

Jul. 17, 1997 (JP) .............................................. 9-006283 U

(51) Int. Cl.[7] ...................................................... G11B 5/09
(52) U.S. Cl. .................................................. 369/54; 369/84
(58) Field of Search .................... 369/83, 84, 54

(56) References Cited

U.S. PATENT DOCUMENTS 5,644,444  *  7/1997  Braithwaite et al. .................. 360/60

FOREIGN PATENT DOCUMENTS 4-232664   8/1992  (JP) .
5-36196    2/1993  (JP) .

OTHER PUBLICATIONS

Microsoft® Windows™ version 3.0 (c) 1985–1990, p. 138–139.*

* cited by examiner

Primary Examiner—Aristotelis M. Psitos
(74) Attorney, Agent, or Firm—Morgan, Lewis & Bockius LLP

(57) ABSTRACT

A disk driving device having a disk drive which records data on and retrieves data from a rewritable disk, including a finalizing means which executes a finalizing operation which inhibits writing to the disk, a judgment means which judges whether a rewritable disk has already been finalized, and a formatting means which forcibly executes a formatting of the disk that has been finalized.

6 Claims, 4 Drawing Sheets

DISK DRIVING DEVICE CAPABLE OF FORMATTING A FINALIZED REWRITABLE DISK

BACKGROUND OF THE INVENTION

This invention relates to a disk driving device having a function which records and reproduces data on and from a rewritable disk, erases recorded data in the rewritable disk, and executes an finalizing operation for disabling the disk from recording.

Conventionally, there has been known a disk driving device (hereinafter referred to as a CD-RW (CD rewritable) driving device) which records various data and reproduces the recorded data on and from a CD-RW disk (i.e. an optical disk in which data can be repeatedly written in, read out, and erased). In the CD-RW driving device of this sort writes address information concerning tracks such as a starting time and a stopping time of the track, on a program memory area (hereinafter referred to as a PMA) which is located at an inner radius of the disk before or after recording the data.

When the CD-RW disk is loaded in the above-mentioned CD-RW driving device, a CD-RW drive collects address information concerning the tracks existing in the PMA of the CD-RW disk, thereby the CD-RW drive recognizes address information concerning all the tracks on the disk, and then, prepares to record and reproduce the data on and from the track based on the address information. The address information concerning tracks is recorded in the PMA at sector by sector.

However, in the conventional CD-RW driving device, when a CD-RW disk has no more data to be added after required data is already written in, the CD-RW disk is finalized, so the finalized disk becomes disabled from being recorded additionally. The disk having been finalized, data of the disk cannot be erased even in the case that the data becomes no more needed. Accordingly, the finalized disk cannot effectively be used as media source for recording data.

SUMMARY OF THE INVENTION

This invention is made to solve the above-mentioned problems. One object of the present invention is to provide a disk driving device having a drive which forcibly erases data of a rewritable disk even if a finalization disables the disk from being written to, thereby making disk usable again.

In order to accomplish the above-mentioned object, according to one aspect of the present invention, a disk driving device having a disk drive which records retrieves data data on and from a rewritable disk, comprises: an erasing means which executes a procedure for erasing recorded data on said rewritable disk which is loaded into the disk driving device; a finalizing means which executes a finalizing operation inhibits writing to which the disk; a judgment means which judges whether a rewritable disk has already been finalized, in the erasing procedure by said erasing means; and, a formatting means which forcibly executes a formatting of the disk that has been finalized.

According to another aspect of the present invention, a disk driving device having a disk drive which records and reproduces data on and from a rewritable disk, comprises: a first judgment means which judges the type of the disk loaded in the drive in a data erasing procedure; a second judgment means which, when said first judgment means judges the disk to be a rewritable disk, judges whether or not the rewritable disk has already been finalized; and, a formatting means which forcibly executes a formatting of the disk when the second judgment means judges that the disk has already been finalized.

DETAILED DESCRIPTION OF THE PREFERRED EMBODIMENT OF THE PRESENT INVENTION

This application is based on Utility Model Application No. 9-6283 filed in Japan, the contents of which are hereby incorporated by reference.

This invention will be described in further detail by way of example with reference to the accompanying drawings.

Figure 1:
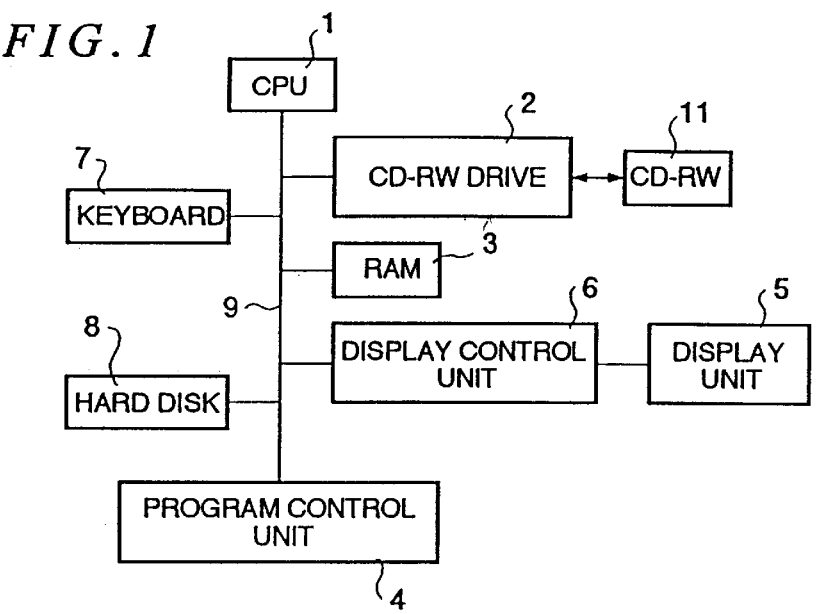
FIG. 1 is a schematic structural view showing a system composing a CD-RW (CD rewritable) driving device according to one embodiment of the present invention.

FIG. 1 is a schematic structural view showing a disk driving device according to one embodiment of the present invention. The CD-RW (compact disk rewritable) driving device is provided with a CPU (central processing unit) 1 which controls the entire system and performs predetermined computations and the like. The CPU 1 is connected via a bus 9 with a CD-RW (CD rewritable) drive 2 which reads out (reproduces) or writes (records) data from and on a CD-RW disk 11 (one type of rewritable disk), a RAM 3 (random access memory) which memorizes data-storage device information for writing in a CD, a program control unit 4 which includes a ROM (read only memory) and the like for storing programs, a display control unit 6 for a display unit 5 comprising a CRT (cathode ray tube) display, a keyboard 7 (or a mouse) acting as an input unit, and a hard disk 8 in which data are stored.

The CPU 1 controls the CD-RW drive 2 with a program which corresponds to a command input through the keyboard 7. The CD-RW drive 2 carries out the transmitting of data, and the producing and reading-out of a CD-RW disk 11. Especially, if the CD-RW disk 11 has been finalized, the system of the present invention forcibly executes a re-formatting of the disk in a procedure of erasing data of the CD-RW disk 11.

Figure 2:
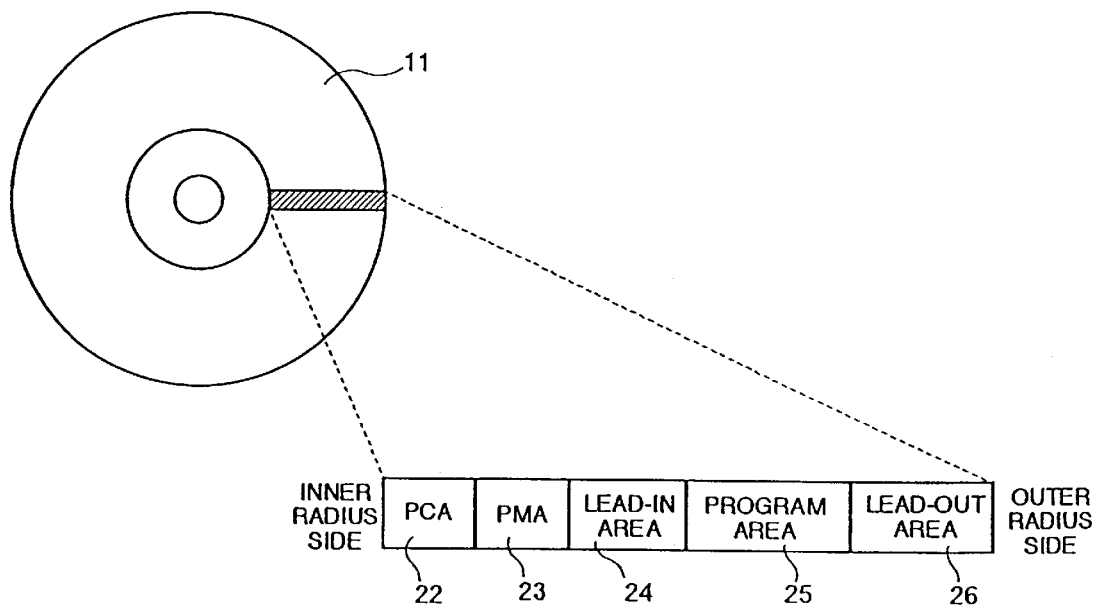
FIG. 2 is a view showing an example of a format for a CD-RW disk to be loaded into the CD-RW disk driving device shown in FIG. 1.

FIG. 2 is a view showing an example of a format for the CD-RW disk 11 to be loaded into the CD-RW disk driving device shown in FIG. 1. The CD-RW disk 11 includes a structure composed of a PCA (power calibration area) 22, a PMA (program memory area) 23, a lead-in area 24, a program area 25 and a lead-out area 26 which are arranged from an inner radius side to an outer radius side. The figure shows a magnified view of the structure.

Figure 3:
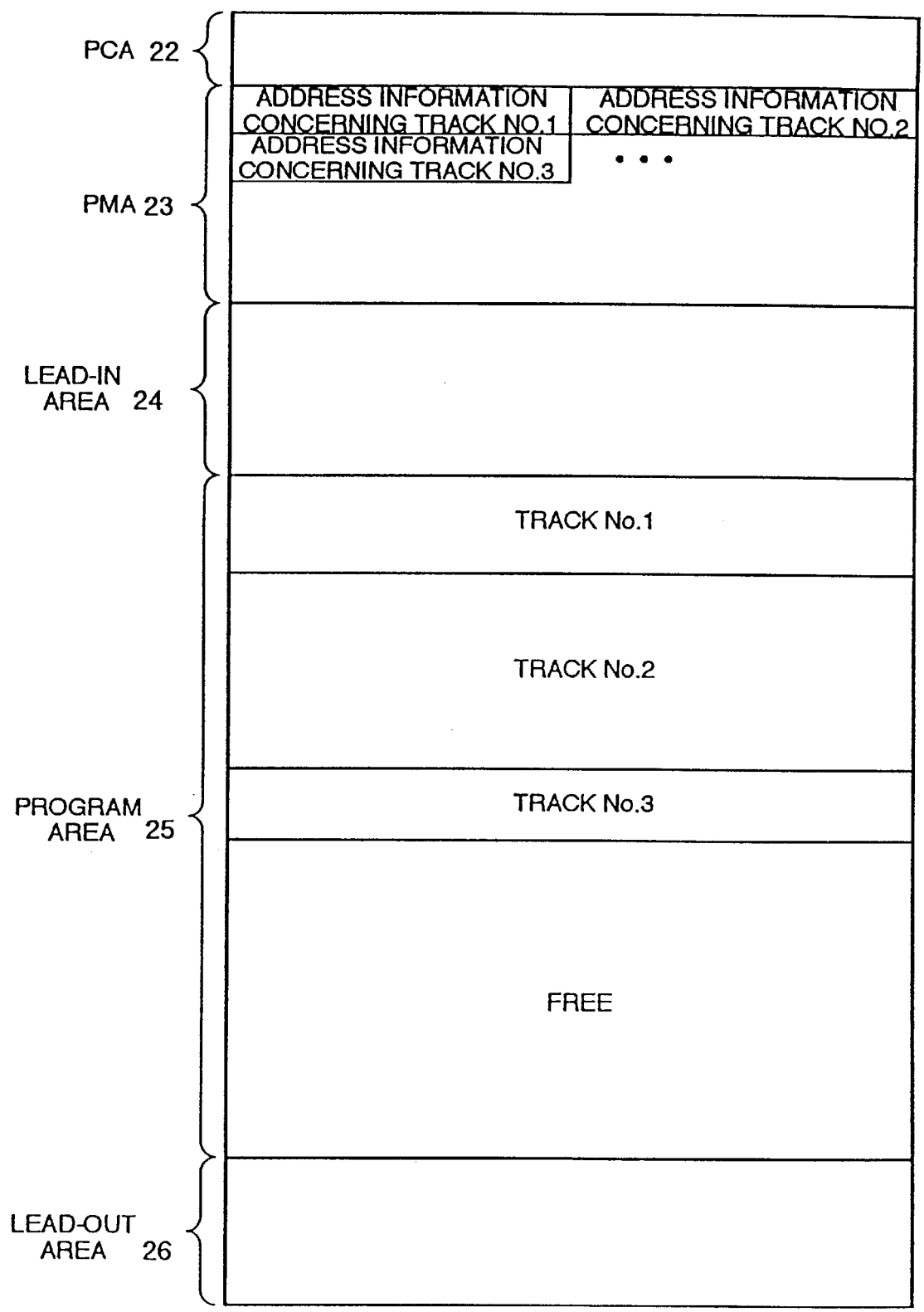
FIG. 3 is a view showing an example of a format for track information in a PMA (program memory area) of the CD-RW disk shown in FIG. 2.

FIG. 3 is a view showing an example of a format for track information in the PMA 23 of the CD-RW disk shown in FIG. 2. The PCA 22 is an area in which the writing power for recording data is calibrated. The PMA 23 is an area in which address information concerning tracks are recorded before or after the data are recorded in the tracks. The lead-in area 24 is an area in which TOC (table of contents) information as session information including track numbers and the starting times of the tracks are recorded. The program area (or a user data area) 25 has a plurality of tracks in which various data are recorded. The lead-out area 26 is an area representing the last part of the session.

The CD-RW disk is a disk in which writing and erasing of data can be repeated about a thousand times while a CD-R disk is a disk in which data is written only once. When data is written in the CD-RW disk, the drive obtains an address in which the data is to be written with reference to the PMA, following which, it writes the data in the obtained address, and renews the PMA. At the time, the TOC information is not yet written in, so that the drive cannot read out the disk as a CD-ROM (CD read only memory). Data can be read out only in the CD-R drive and the CD-RW drive with reference to the PMA. In this state, it is possible to record data with reference to the PMA.

In order to read out the data of the CD-RW disk as the CD-ROM, the TOC information is required to be written in with the session (unit of a data track) closed. The operation for closing the session and writing TOC information is called a session-close. After the session-close is executed, the data which has been already written, can be read by the CD-ROM driving device. In this state, it is possible to write additional data in the same way. The added data can also be read out after the session-close is executed. The session number is also renewed in this case.

Figure 5:
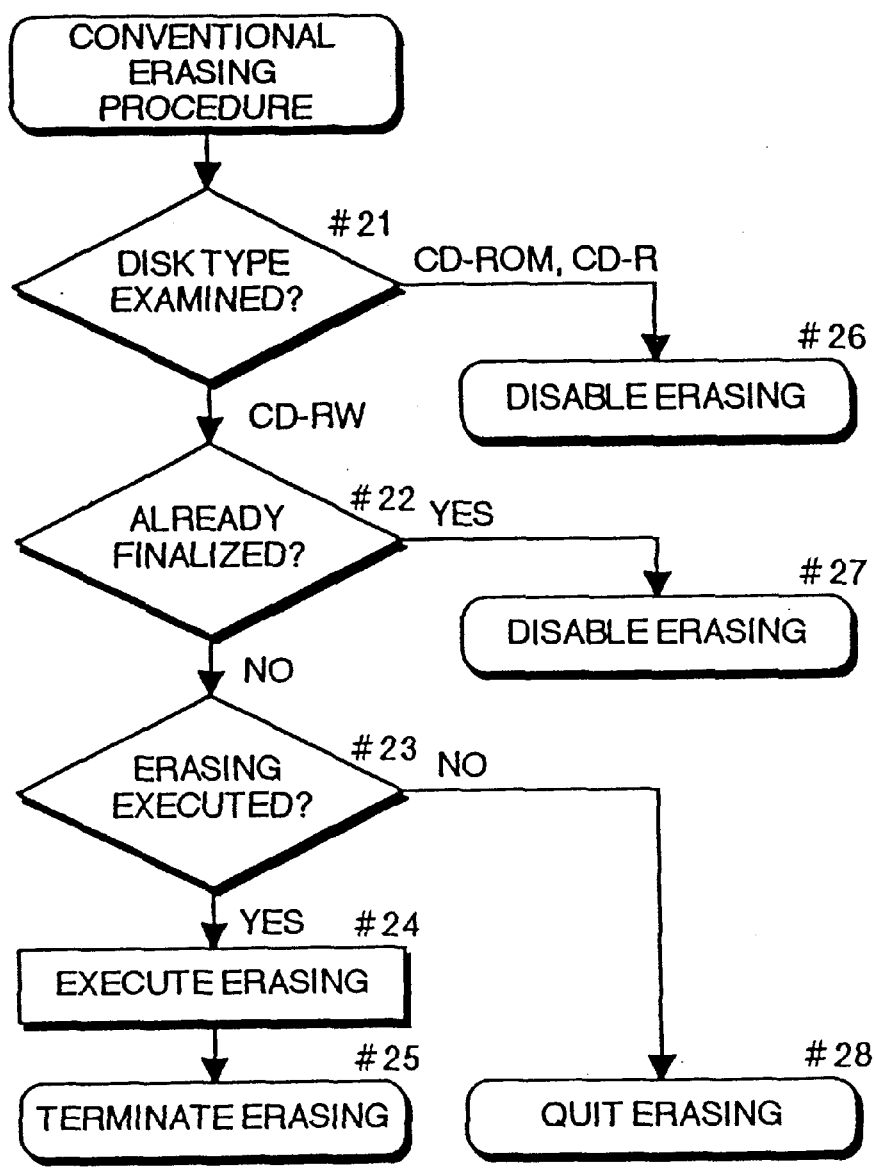

When the CD-RW disk has no more space for data, the CD-RW disk is finalized. Being finalized, the CD-RW disk becomes a read-only media just the same as the CD-ROM. However, although the CD-RW disk is originally an erasable media, the finalized CD-RW becomes the read-only media, so that the data of the disk cannot be erased in this state. Now, a conventional erasing procedure is explained with reference to FIG. 5. In the erasing procedure, the type of disk is examined first of all (#21), and if the disk is a CD-ROM disk or a CD-R disk, it is disabled from being erased (#26). If it is a CD-RW disk, the disk is examined whether to have been finalized already (#22). Having been finalized, the disk is disabled from being erased (#27). If the disk has not been finalized, it is judged whether an erasing should be executed (#23). When so, the erasing is executed (#24), and then the erasing procedure is terminated (#25). If not, the erasing procedure is quit (#28).

On the contrary, the drive of the disk driving device according to the present invention ignores an information concerning a finalization of the loaded CD-RW disk, and overwrites it, thereby, the data on the disk which has been in a unerasable state due to the finalization, can be erased again.

Figure 4:
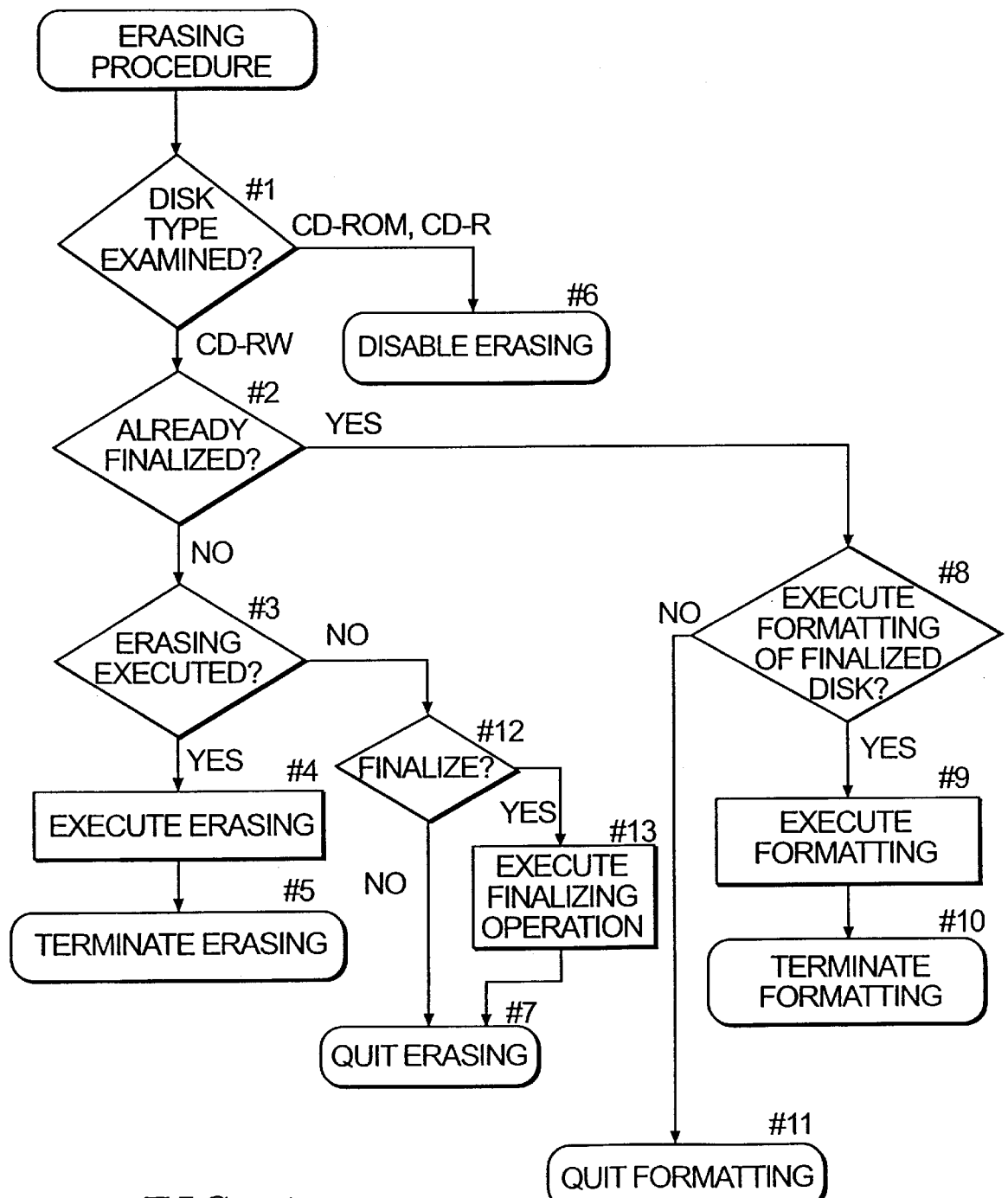
FIG. 4 is a flowchart of an erasing procedure in the CD-RW disk driving device of the present embodiment, and, FIG. 5 is a flowchart of a conventional erasing procedure.

The erasing procedure in the device of the present invention is explained in the paragraphs that follow with reference to a flowchart of FIG. 4. In the erasing procedure, the type of disk is examined first of all (#1), and if the disk is a CD-ROM disk or a CD-R disk, it is disabled from being erased (#6). If it is a CD-RW disk, the disk is examined whether to have been finalized already (#2). Having been finalized, the disk is not disabled from being erased, but it is examined whether to execute a formatting of the finalized disk (#8). When so, the formatting is executed (#9), and then terminated (#10). If it is determined not to execute the formatting of the finalized disk, the formatting is quit (#11). If it is judged in step #2 that the disk has not been finalized, it is examined whether to execute an erasing (#3). When so, the erasing is executed (#4), and then, the erasing procedure is terminated (#5). If the erasing procedure is not executed, then it is determined whether to finalize the disk (#12). If the finalizing operations (#13) is not executed, then the procedure is terminated (#7). The point is that steps from #8 to #11 are added to the erasing procedure in the present invention, which is different from the conventional one.

As discussed above, in the procedure for erasing data of the CD-RW disk, if the CD-RW disk has been finalized already, the disk is forcibly formatted again, so that the disk can be used again.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A disk driving device having a disk drive which records data on and retrieves data from a rewritable disk, comprising:
    an erasing means which executes a procedure for erasing recorded data on said rewritable disk which is loaded into the disk driving device;
    a finalizing means which executes a finalizing operation which inhibits writing to the disk;
    a judgment means which judges whether a rewritable disk has already been finalized, in the erasing procedure by said erasing means; and
    a formatting means which forcibly executes a formatting of the disk that has been finalized.

2. The disk driving device as claimed in claim 1, wherein said formatting means executes the formatting which is the same as a procedure for erasing all data on the rewritable disk.

3. The disk driving device as claimed in claim 1, wherein it is examined whether to execute the formatting of the disk after the disk is judged to have been finalized.

4. The disk driving device as claimed in claim 1, further comprising a confirmation means for examining whether to execute the erasing operation after the disk has been judged not to have been finalized.

5. The disk driving device as claimed in claim 1, wherein the rewritable disk is a CD-RW (rewritable) disk.

6. A disk driving device having a disk drive which records data on and retrieves data from a rewritable disk, comprising:
    a first judgment means which judges the type of a disk loaded into the drive in a data erasing procedure;
    a second judgment means which, when said first judgment means judges the disk to be a rewritable disk, judges whether the rewritable disk has already been finalized; and,
    a formatting means which forcibly executes a formatting of the disk when the second judgment means judges that the disk has already been finalized.

* * * * *